US010551960B2

(12) United States Patent
Rhee et al.

(10) Patent No.: US 10,551,960 B2
(45) Date of Patent: Feb. 4, 2020

(54) INPUT PROCESSING METHOD AND DEVICE

(71) Applicant: Samsung Electronics Co., Ltd, Gyeonggi-do (KR)

(72) Inventors: Taik Heon Rhee, Seoul (KR); Myoung Soo Park, Gyeonggi-do (KR); In Sil Han, Seoul (KR); Hyun Yeul Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 45 days.

(21) Appl. No.: 15/356,442

(22) Filed: Nov. 18, 2016

(65) Prior Publication Data
US 2017/0147131 A1 May 25, 2017

(30) Foreign Application Priority Data
Nov. 20, 2015 (KR) .......................... 10-2015-0163555

(51) Int. Cl.
G06F 3/041 (2006.01)
G06F 3/0488 (2013.01)
G06F 3/0487 (2013.01)
G06F 3/0484 (2013.01)

(52) U.S. Cl.
CPC .......... G06F 3/0416 (2013.01); G06F 3/0487 (2013.01); G06F 3/0488 (2013.01); G06F 3/04186 (2019.05); G06F 3/0484 (2013.01)

(58) Field of Classification Search
CPC .... G06F 3/0416; G06F 3/04883; G06F 3/041; G06F 3/04186; G06F 3/0487; G06F 3/0488; G06F 3/0484
See application file for complete search history.

(56) References Cited

U.S. PATENT DOCUMENTS

| 2011/0050588 A1* | 3/2011 | Li .......................... G06F 3/0414 345/173 |
| 2011/0199323 A1* | 8/2011 | Lin ........................ G06F 3/0416 345/173 |
| 2012/0206363 A1* | 8/2012 | Kyprianou .......... G06F 3/04883 345/168 |
| 2014/0365883 A1* | 12/2014 | Ramsay .................. G06F 3/016 715/702 |

(Continued)

FOREIGN PATENT DOCUMENTS

| KR | 20100059698 | 6/2010 |
| KR | 20130042913 | 4/2013 |

Primary Examiner — Brent D Castiaux

(57) ABSTRACT

According to various embodiments of the present disclosure, an electronic device includes an input panel configured to sense a touch area corresponding to a touch manipulation of a user periodically. A processor is configured to set a reference area based on at least one first touch area and calculate a difference between a second touch area and the reference area. The processor further determines that a touch event occurs if the difference value is at least a first threshold value. Embodiments may additionally include the processor calculating a rate of change of the touch area based on the sensed touch area, and determining that the specified touch event occurs if the difference value is greater than or equal to the first threshold value and if the rate of change of the touch area is greater than or equal to a second threshold value.

16 Claims, 8 Drawing Sheets

(56) References Cited

U.S. PATENT DOCUMENTS

2015/0015520 A1\* 1/2015 Narita .................. G06F 3/0485
                                                          345/173
2015/0135109 A1   5/2015 Zambetti et al.
2016/0004427 A1   1/2016 Zambetti et al.
2016/0004428 A1   1/2016 Bernstein et al.

\* cited by examiner

INPUT PROCESSING METHOD AND DEVICE

CROSS-REFERENCE TO RELATED APPLICATION(S) AND CLAIM OF PRIORITY

The present application is related to and claims the benefit under 35 U.S.C. § 119(a) of a Korean patent application filed on Nov. 20, 2015 in the Korean Intellectual Property Office and assigned Serial number 10-2015-0163555, the entire disclosure of which is hereby incorporated by reference.

TECHNICAL FIELD

The present disclosure relates to a method and a device for processing a touch input of a user, which is input to a panel.

BACKGROUND

With the development of electronic technologies, various types of electronic devices are being developed and supplied. In recent years, portable electronic devices, which have a variety of functions, such as a smart phone, a tablet personal computer (PC), and the like, are widely popularized.

Most of electronic devices that have been recently developed have used a touch panel (or a pen sensor panel) as an input device. For example, a user may intuitively input a user manipulation to a touch screen combined with a display.

Although a touch screen (e.g., a touch panel (or a pen sensor panel)) included in the above-mentioned display is capable of recognizing and processing various kinds of touch inputs, a new kind of touch input has been required for the diversification of the function and for user convenience.

SUMMARY

To address the above-discussed deficiencies, it is a primary object to provide an input processing method and a device that are configured to recognize a new kind of touch event based on a touch area sensed by a touch manipulation of a user.

Various embodiments of the present disclosure include an electronic device having an input panel configured to sense a touch area corresponding to a touch manipulation of a user at a specified period. The electronic device further includes a processor configured to set a reference area based on a portion of the touch area sensed by the input panel at the specified period and calculate a difference value between the touch area sensed by the input panel and the reference area. The processor may further determine that a specified touch event occurs if the difference value is greater than or equal to a specified value.

In accordance with various embodiments of the present disclosure, an input processing method of an electronic device includes sensing a touch area corresponding to a touch manipulation of a user through an input panel at a specified period and setting a reference area based on a portion of the touch area. The method further includes calculating a difference value between the touch area and the reference area, and determining that a specified touch event occurs if the difference value is greater than or equal to a specified value.

In accordance with various embodiments of the present disclosure, a computer-readable recording medium in which a program is recorded, the program performing a method that includes sensing a touch area corresponding to a touch manipulation of a user from an input panel at a specified period and setting a reference area based on a portion of the touch area. The method further including calculating a difference value between the touch area and the reference area, and determining that a specified touch event occurs if the difference value is greater than or equal to a specified value.

Other embodiments, aspects, advantages, and salient features of the disclosure will become apparent to those skilled in the art from the following detailed description, which, taken in conjunction with the annexed drawings, discloses various embodiments of the present disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
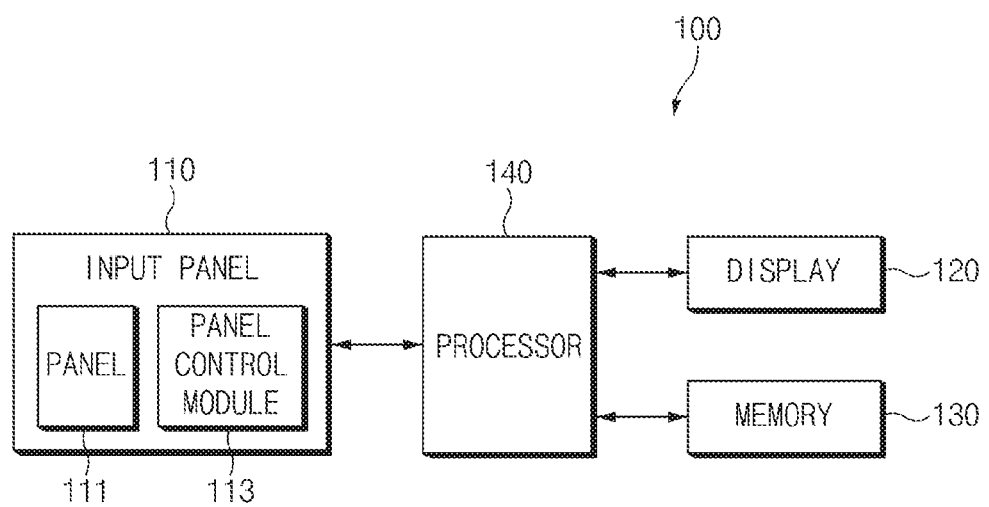
FIG. 1 is a block diagram illustrating a configuration of an electronic device, according to various embodiments of the present disclosure.

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device.

Various embodiments of the present disclosure may be described with reference to accompanying drawings. Accordingly, those of ordinary skill in the art will recognize that modification, equivalent, and/or alternative on the various embodiments described herein can be variously made without departing from the scope and spirit of the present disclosure. With regard to description of drawings, similar elements may be marked by similar reference numerals.

In the disclosure disclosed herein, the expressions "have", "may have", "include" and "comprise", or "may include" and "may comprise" used herein indicate existence of corresponding features (e.g., elements such as numeric values, functions, operations, or components) but do not exclude presence of additional features.

In the disclosure disclosed herein, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used herein may refer to various elements of various embodiments of the present disclosure, but do not limit the elements. For example, "a first user device" and "a second user device" may indicate different user devices regardless of the order or priority thereof. For example, without departing the scope of the present disclosure, a first element may be referred to as a second element, and similarly, a second element may be referred to as a first element.

It will be understood that when an element (e.g., a first element) is referred to as being "(operatively or communicatively) coupled with/to" or "connected to" another element (e.g., a second element), it may be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element).

According to the situation, the expression "configured to" used herein may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other components. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Terms used in the present disclosure are used to describe specified embodiments and are not intended to limit the scope of the present disclosure. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the present disclosure. In some cases, even if terms are terms which are defined in the specification, they may not be interpreted to exclude embodiments of the present disclosure.

For example, an electronic device according to various embodiments of the present disclosure may include at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to various embodiments, a wearable device may include at least one of an accessory type of a device (e.g., a timepiece, a ring, a bracelet, an anklet, a necklace, glasses, a contact lens, or a head-mounted-device (HMD)), one-piece fabric or clothes type of a device (e.g., electronic clothes), a body-attached type of a device (e.g., a skin pad or a tattoo), or a bio-implantable type of a device (e.g., implantable circuit).

In some various embodiments of the present disclosure, an electronic device may be a home appliance. The smart home appliance may include at least one of, for example, a television (TV), a digital versatile disc (DVD) player, an audio, a refrigerator, an air conditioner, a cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ or PlayStation™), an electronic dictionary, an electronic key, a camcorder, or an electronic picture frame.

FIG. 1 is a block diagram illustrating a configuration of an electronic device, according to various embodiments of the present disclosure.

Referring to FIG. 1, an electronic device 100 may include an input panel 110, a display 120, a memory 130, and a processor 140. The electronic device 100 according to various embodiments of the present disclosure may process a new kind of input event that is different from the existing input event (e.g., flick, tap, drag, or the like). For example, a user may input a touch manipulation that increases an area of the touch manipulation by reducing an angle between a finger and the input panel 110 after the user touches the input panel 110. In this disclosure, the above-mentioned touch manipulation (or the input event) is referred to as a "tap down".

According to an embodiment, the input panel 110 may sense a user manipulation (e.g., a touch manipulation or a pen manipulation). According to an embodiment, the input panel 110 may include a panel 111 and a panel control module 113.

According to an embodiment, the panel 111 (e.g., a touch screen) may receive a driving signal generated by the panel control module 113 and may scan channels in response to the driving signal. For example, if a specified object is adjacent to a specific location of the panel 111 while the channels are scanned, capacitance or an electric field may change. The change in the capacitance or the electric field may be sent to the panel control module 113. According to an embodiment, the panel 111 may include a touch sensor panel that senses the touch manipulation of the user or a pen recognition panel that senses a pen manipulation of the user. According to an embodiment, the touch sensor panel and the pen recognition panel may operate in the same manner or in different manners. In the case where the touch sensor panel and the pen recognition panel operate in the same manner (e.g., a capacitance manner), the touch sensor panel and the pen recognition panel may correspond to the same panel.

According to an embodiment, the panel control module 113 may generate the driving signal and may provide the generated driving signal to the panel 111. According to an embodiment, the panel control module 113 may sense touch coordinates (e.g., pixel coordinates) corresponding to the touch manipulation (or the pen manipulation) by analyzing a signal received from the panel 111. According to an embodiment, the panel control module 113 may sense a touch area corresponding to the touch manipulation by analyzing the signal received from the panel 111. For example, the panel control module 113 may sense a ratio of a currently touched area to an entire area of the input panel 110. As another example, the panel control module 113 may sense the number of grids (or nodes), on which the touch manipulation of the user is input, from among a plurality of grids (or nodes) included in the input panel 110.

According to an embodiment, the panel control module 113 may sense the touch coordinates and/or the touch area corresponding to the touch manipulation of the user at a specified period (e.g., 10 ms (millisecond)) (or a frequency (e.g., 100 Hz)). For example, the panel control module 113 may sense the touch coordinates and the touch area corresponding to the touch manipulation of the user by supplying the driving signal to the panel 111 at the specified period. According to an embodiment, the panel control module 113 may sense the touch coordinates corresponding to the touch manipulation of the user for respective x-axis and y-axis coordinates. The touch coordinates may include, for example, the x-axis coordinate and the y-axis coordinate that correspond to the touch manipulation.

According to an embodiment, the panel control module 113 may send the touch coordinates and/or the touch area to the processor 140. For example, the panel control module 113 may send the touch coordinates and the touch area to the processor 140 at the specified period (e.g., 10 ms).

According to an embodiment, the input panel 110 may not only sense the touch manipulation of the user through a direct contact with the panel 111 (e.g., the touch sensor panel or the pen recognition panel), but it may also sense the user manipulation input within a specified distance without a direct contact with the panel 111.

According to an embodiment, the display 120 may display a user interface. According to an embodiment, the display 120 may change the user interface based on the touch manipulation of the user and may display the changed user interface.

According to an embodiment, the input panel 110 and the display 120, for example, may be implemented with a touch screen in which the input panel is arranged on a display panel to display and sense the touch manipulation at the same time.

According to an embodiment, the memory 130 may include a volatile memory (e.g., a random access memory (RAM)) and a nonvolatile memory (e.g., a flash memory). According to an embodiment, the memory 130 may store a reference area. According to an embodiment, if the reference area is set by the processor 140, the memory 130 may store the reference area thus set. For example, the reference area may be stored in the volatile memory (e.g., RAM). According to an embodiment, the reference area stored in the memory 130 may be changed whenever the touch manipulation of the user is input.

According to an embodiment, the memory 130 may store at least one reference value for determining whether a specified touch event (e.g., a tap down event) occurs. For example, the reference value may be stored in the volatile memory or in the nonvolatile memory. The reference value may include, for example, an area reference value (or a first reference value) for comparison with a difference value (or an area variation) between a touch area and a reference area, a reference value for a rate of change (or a second reference value) for comparison with a rate of change of the touch area, and a reference value for the amount of movement (or a third reference value) for comparison with the amount of movement of the touch coordinates. According to an embodiment, if the reference value is changed by the processor 140, the memory 130 may store the changed reference value.

According to an embodiment, the processor 140 may control overall operations of the electronic device 100. According to an embodiment, the processor 140 may include at least one processor. According to an embodiment, the processor 140 may process a touch input of the user according to various embodiments of the present disclosure by controlling the input panel 110, the display 120, or the memory 130. According to an embodiment, the processor 140 (e.g., an application processor) may be implemented with a system on chip (SoC) including a central processing unit (CPU), a graphic processing unit (GPU), a memory, and the like.

Figure 2:
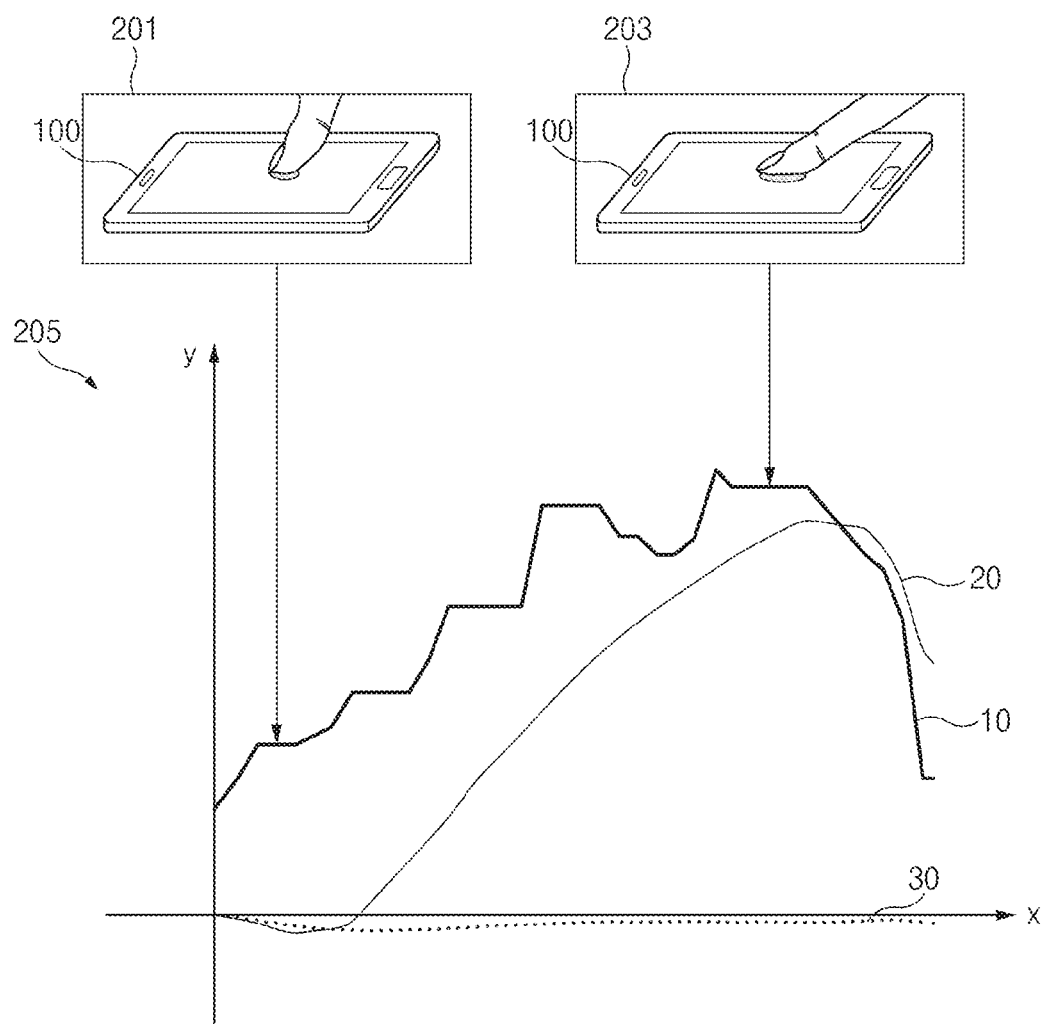
FIG. 2 illustrates a sensing value of an input panel according to a tap down manipulation, according to various embodiments of the disclosure.

FIG. 2 is a drawing illustrating an example of a sensing value of an input panel according to a tap down manipulation.

Two images 201 and 203 illustrated in FIG. 2 illustrate a process of inputting a tap down manipulation. The first image 201 illustrates a state in which a user touches an input panel with a finger to input the tap down manipulation. The second image 203 illustrates a state in which the user ends the input of the tap down manipulation by reducing an angle between the finger and the panel.

The graph 205 illustrated in FIG. 2 shows a sensing value of the input panel according to the input of the tap down manipulation. The graph 205 may include, for example, a touch area 10, a y-axis touch coordinate 20, and an x-axis touch coordinate 30. An x-axis of the graph 205 may correspond to a time axis, and a y-axis of the graph 205 may correspond to a sensing value of each of the touch area 10, the y-axis touch coordinate 20, and the x-axis touch coordinate 30. The touch area 10 and the y-axis touch coordinate 20 included in the graph 205 show an increasing tendency in the input process of the tap down manipulation and show a decreasing tendency if the user ends the touch. Accordingly, the touch area 10 and the y-axis touch coordinate 20 may be illustrated with a graph of the form of a camel's hump or a curve. It may be understood that there is almost no change in the x-axis touch coordinate 30 included in the graph 205 during the input process of the tap down manipulation.

According to an embodiment, the processor 140 may set a reference area based on a portion of the touch area received from the touch panel 110. According to an embodiment, the processor 140 may set a touch area, which is first received from the input panel 110 with regard to one touch manipulation, as the reference area. According to an embodiment, the processor 140 may set a representative value of a plurality of touch areas (e.g., five), which are successively received from the touch area that is first received, as the reference area. For example, the processor 140 may set one of an average value, a low or minimum value, and a high or maximum value of the plurality of touch areas as the reference area.

An area of a finger may vary for each gender, weight, or finger of the user. For this reason, even though the same touch manipulation is input, a touch area that is sensed on the input panel 110 may vary for each user or finger. According to various embodiments of the present disclosure, the processor 140 may improve recognition performance of the tap down event by setting the reference area based on the touch area practically sensed according to a touch manipulation of the user in consideration of the characteristics of the user or the finger.

According to an embodiment, the processor 140 may calculate a difference value between the reference area and the touch area received from the input panel 110. For example, the processor 140 may receive the touch area from the input panel 110 at a specified period. According to an embodiment, the processor 140 may calculate the difference value (or an area variation) by comparing the touch area received from the input panel 110 with the reference area. According to an embodiment, the processor 140 may determine whether the difference value between the touch area and the reference area is greater than or equal to a specified value by comparing the difference value between the touch area and the reference area with the specified value (e.g., an area reference value).

According to an embodiment, the processor 140 may calculate a rate of change of the touch area based on the touch area received from the input panel 110. For example, the processor 140 may receive the touch area from the input panel 110 at the specified period. The processor 140 may calculate the rate of change of the touch area per unit time (e.g., a reception period of the touch area (e.g., 10 ms (millisecond))) based on the touch area received from the input panel 110. According to an embodiment, the processor 140 may determine whether the rate of change of the touch area is greater than or equal to a specified value by comparing the rate of change of the touch area with the specified value (e.g., a reference value for a rate of change).

According to an embodiment, the processor 140 may calculate the amount of movement (or variation) of touch coordinates by using the touch coordinates received from the input panel 110. For example, the processor 140 may receive the touch coordinates from the input panel 110 at the specified period. The processor 140 may calculate the amount of movement of the touch coordinates based on the touch coordinates that are first received from the input panel 110. According to an embodiment, the processor 140 may calculate the amount of movement of each of an x-axis coordinate and a y-axis coordinate. A unit of the amount of movement may be, for example, pixels or density-independent pixels (DP). According to an embodiment, the processor 140 may determine whether the amount of movement of the touch coordinates is greater than or equal to a specified value by comparing the amount of movement of the touch coordinates with the specified value (e.g., a distance reference value).

According to an embodiment, a reference value (e.g., the area reference value, the reference value for a rate of change, and the distance reference value) for determining whether the tap down event occurs may be a fixed value. For example, the reference value may be a value that is a preset value upon manufacturing the electronic device 100. According to an embodiment, the reference value (e.g., the area reference value, the reference value for a rate of change, and the distance reference value) for determining whether the tap down event occurs may be changed. According to an embodiment, the processor 140 may change the reference value based on the reference area. For example, the processor 140 may set the reference value for determining whether the tap down event occurs in proportion to the reference area. For example, as the set reference area becomes larger, the area reference value, the reference value for a rate of change, and/or the distance reference value may be set to be greater.

According to an embodiment, the processor 140 may determine whether the tap down event occurs based on at least one of the difference value between the touch area and the reference area, the rate of change of the touch area, a moving direction of the touch coordinates, and the amount of movement of the touch coordinates.

Figure 3:
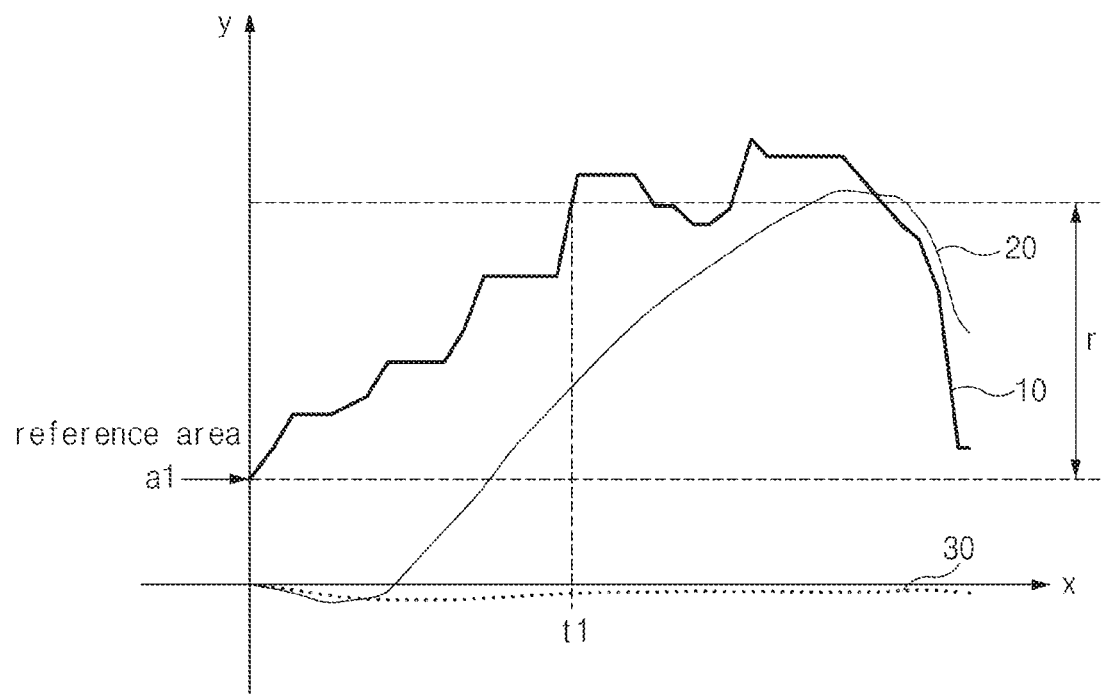
FIG. 3 illustrates a sensing value of an input panel using tap down manipulation, according to various embodiments of the disclosure.

FIG. 3 illustrates a sensing value of an input panel using a tap down manipulation according to various embodiments of the present disclosure.

A graph illustrated in FIG. 3 may include, for example, the touch area 10, the y-axis touch coordinate 20, and the x-axis touch coordinate 30. The x-axis of the graph may correspond to a time axis, and the y-axis may correspond to a sensing value of each of the touch area 10, the y-axis touch coordinate 20, and the x-axis touch coordinate 30.

Referring to FIG. 3, the processor 140 may set, for example, a touch area a1, which is first received from the input panel 110 with regard to a touch manipulation of a user, as a reference area. According to an embodiment, the processor 140 may calculate a difference value (or an area variation) by comparing the reference area with the received touch area whenever the touch area is received from the input panel 110. According to an embodiment, if the difference value between the touch area and the reference area is greater than or equal to a specified value (e.g., an area reference value), the processor 140 may determine that a tap down event occurs. For example, referring to FIG. 3, the processor 140 may determine that the tap down event occurs at a point in time t1 when the difference value between the touch area and the reference area becomes equal to an area reference value "r".

According to an embodiment, if the difference value between the touch area and the reference area is greater than or equal to the specified value (e.g., the area reference value) and a rate of change of the touch area is greater than or equal to a specified value (e.g., a reference value for a rate of change), the processor 140 may determine that the tap down event occurs. For example, if the rate of change of the touch area is less than the reference value for a rate of change even though the difference value between the touch area and the reference area is greater than or equal to the area reference value, the processor 140 may determine that the tap down event does not occur. The processor 140 may determine that the tap down event occurs, at a point in time when the difference value between the touch area and the reference area is greater than or equal to the area reference value and the rate of change of the touch area is greater than or equal to the reference value for a rate of change at the same time.

Figure 4:
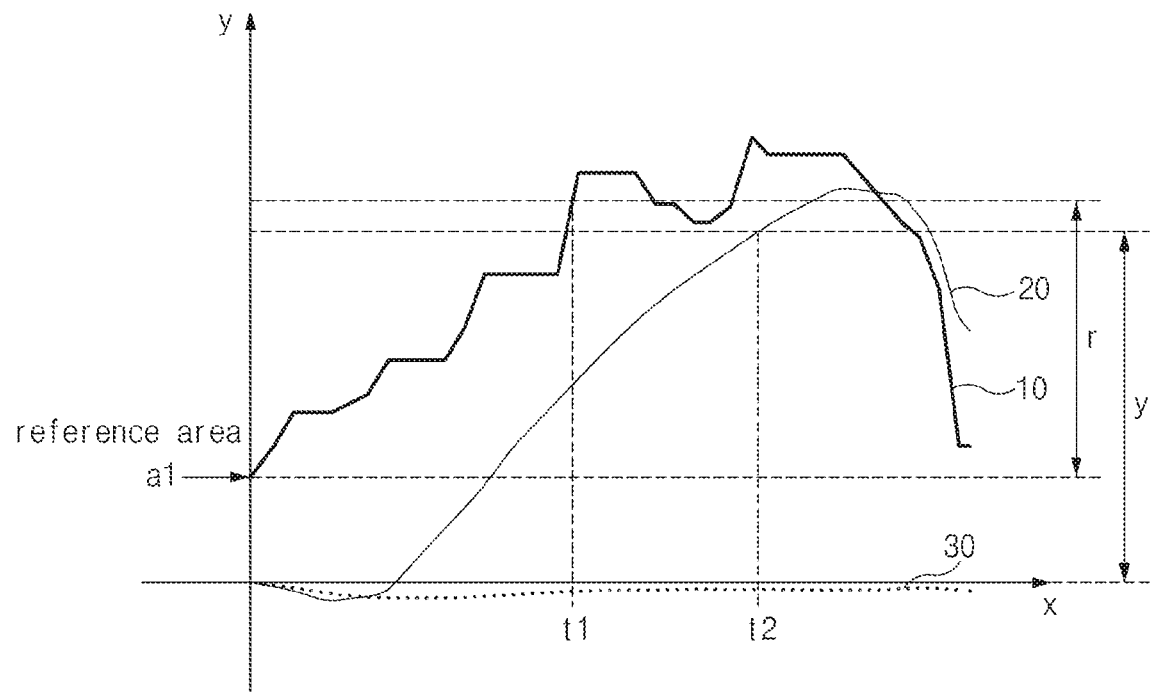
FIG. 4 illustrates a sensing value of an input panel using tap down manipulation, according to various embodiments of the disclosure.

FIG. 4 illustrates a sensing value of an input panel using a tap down manipulation according to various embodiments of the present disclosure.

A graph illustrated in FIG. 4 may include, for example, the touch area 10, the y-axis touch coordinate 20, and the x-axis touch coordinate 30. The x-axis of the graph may correspond to a time axis, and the y-axis may correspond to a sensing value of each of the touch area 10, the y-axis touch coordinate 20, and the x-axis touch coordinate 30.

Referring to FIG. 4, the processor 140 may set, for example, the touch area al, which is first received from the input panel 110 with regard to a touch manipulation of a user, as a reference area. According to an embodiment, the processor 140 may calculate a difference value (or an area variation) by comparing the reference area with the received touch area whenever the touch area is received from the input panel 110. According to an embodiment, the processor 140 may determine whether the difference value between the touch area and the reference area is greater than or equal to a specified value (e.g., an area reference value).

According to an embodiment, the processor 140 may calculate the amount of movement of touch coordinates based on the touch coordinates first received from the input panel 110 whenever the touch coordinates are received from the input panel 110. According to an embodiment, the processor 140 may determine whether the amount of movement of the touch coordinates is greater than or equal to a specified value (e.g., a distance reference value).

According to an embodiment, if the difference value between the touch area and the reference area is greater than or equal to the specified value (e.g., the area reference value) and the touch coordinates move in a specified direction (e.g., y-axis) by a specified distance or more (e.g., the distance reference value), the processor 140 may determine that the tap down event occurs. The specified direction may be, for example, a direction that faces a lower side of a user interface displayed on the display 120. For example, the specified direction may be a y-axis direction of a touch panel when the user interface displayed in the display 120 is displayed in a longitudinal direction (or a default mode). As another example, the specified direction may be an x-axis direction of the touch panel when the user interface displayed in the display 120 is displayed in a transverse direction (or a landscape mode).

Referring to FIG. 4, since the amount of movement of the y-axis touch coordinate is less than a distance reference value "y" at a point in time t1 when the difference value between the touch area and the reference area becomes equal to the area reference value "r", the processor 140 may determine that the tap down event does not occur. Afterwards, the processor 140 may determine that the tap down event occurs, at a point in time t2 when the difference value between the touch area and the reference area is greater than or equal to the area reference value "r" and the amount of movement of the y-axis touch coordinate is greater than or equal to the distance reference value "y".

According to an embodiment, if the difference value between the touch area and the reference area is greater than or equal to the specified value (e.g., the area reference value), the rate of change of the touch area is greater than or equal to the specified value (e.g., the reference value for a rate of change), and the touch coordinates move in the specified direction (e.g., y-axis) by the specified distance or more (e.g., the distance reference value), the processor 140 may determine that the tap down event occurs. For example, although some of the difference value between the touch area and the reference area, the rate of change of the touch area, the moving direction of the touch coordinates, and the amount of movement of touch coordinates satisfy the specified conditions, if some of the others do not satisfy the conditions, the processor 140 may determine that the tap down event does not occur. The processor 140 may determine that the tap down event occurs, at a point in time when all variables, such as the difference value between the touch area and the reference area, the rate of change of the touch area, the moving direction of the touch coordinates, and the amount of movement of the touch coordinates, satisfy the specified reference values.

Figure 5:
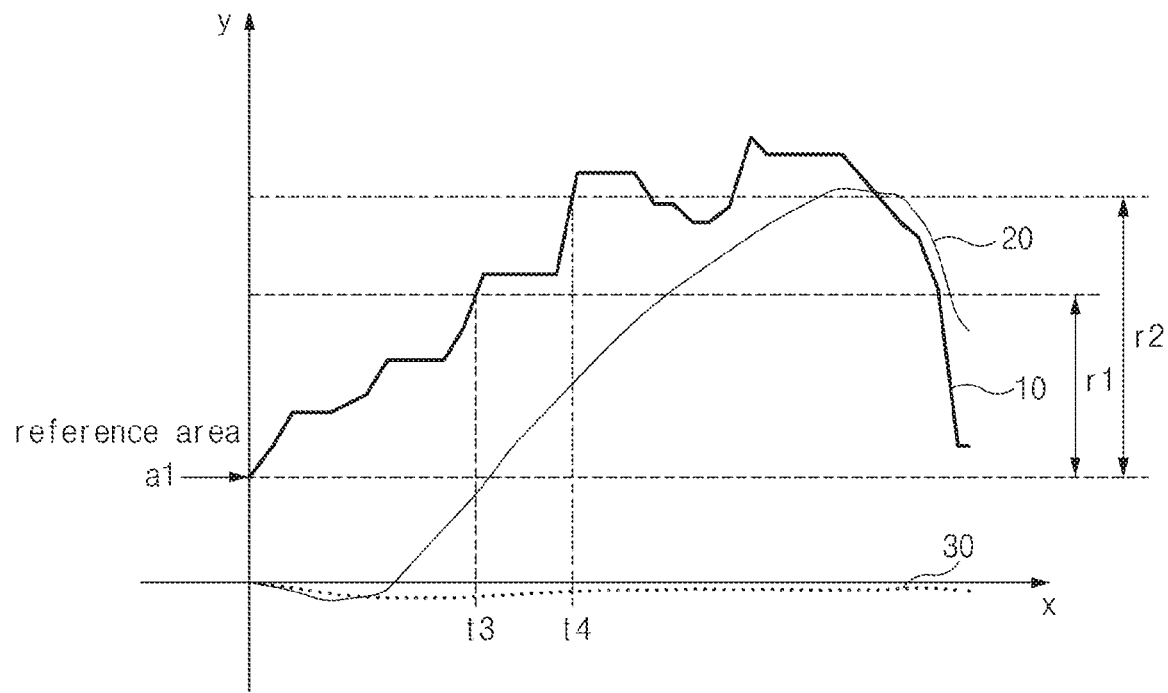
FIG. 5 illustrates a sensing value of an input panel using tap down manipulation, according to various embodiments of the disclosure.

FIG. 5 illustrates a sensing value of an input panel using a tap down manipulation according to various embodiments of the disclosure.

A graph illustrated in FIG. 5 may include, for example, the touch area 10, the y-axis touch coordinate 20, and the x-axis touch coordinate 30. The x-axis of the graph may correspond to a time axis, and the y-axis may correspond to a sensing value of each of the touch area 10, the y-axis touch coordinate 20, and the x-axis touch coordinate 30.

Referring to FIG. 5, the processor 140 may set, for example, the touch area al, which is first received from the input panel 110 with regard to a touch manipulation of a user, as a reference area. According to an embodiment, the processor 140 may set a plurality of reference values associated with a difference value between the touch area and the reference area. For example, the processor 140 may set a first reference value r1 for comparison with the difference value between the touch area and the reference area and a second reference value r2 that is greater than the first reference value r1. The first reference value r1 may correspond to, for example, a reference value for displaying an input status of a tap down manipulation on the display 120. The second reference value r2 may correspond to, for example, an area reference value for determining whether the above-mentioned tap down event occurs.

According to an embodiment, the processor 140 may calculate the difference value (or an area variation) by comparing the reference area with the received touch area whenever the touch area is received from the input panel 110. According to an embodiment, if the difference value between the touch area and the reference area is greater than or equal to the first reference value r1, the processor 140 may change a user interface displayed on the display 120 so as to correspond to the difference value. For example, referring to FIG. 5, the processor 140 may change the user interface displayed on the display 120 from a point in time t3 when the difference value between the touch area and the reference area becomes equal to the first reference value r1. The user interface displayed on the display 120 will be described with reference to FIG. 6. Afterwards, the processor 140 may determine that the tap down event occurs at a point in time t4 when the difference value between the touch area and the reference area becomes equal to the second reference value r2.

According to an embodiment, if the tap down event occurs, the processor 140 may perform a function corresponding to the tap down event. For example, if the tap down event occurs, the processor 140 may change a type, a shape, a location, or the like of the user interface (or content) displayed on the display 120. As another example, if the tap down event occurs, the processor 140 may perform a zoom-in function or may increase an audio level (or an audio volume) of the electronic device 100.

According to an embodiment, if it is determined that the tap down event occurs, the processor 140 may perform the function corresponding to the tap down event immediately. For example, if it is determined that the tap down event occurs, the processor 140 may perform the function corresponding to the tap down event even though the touch manipulation of the user does not end (e.g., even though a touch up event does not occur).

According to an embodiment, if the touch manipulation of the user ends (e.g., if the touch up event occurs) after it is determined that the tap down event occurs, the processor 140 may perform the function corresponding to the tap down event. For example, although it is determined that the tap down event occurs while the touch manipulation of the user is input, the processor 140 may wait the end of the touch manipulation without performing the function corresponding to tap down event.

According to an embodiment, the processor 140 may perform a corresponding function based on the touch area after it is determined that the tap down event occurs. For example, if it is determined that the tap down event occurs, the processor 140 may allow the content displayed on the display 120 to be enlarged more and more. The processor 140 may allow the content to be enlarged more and more as the touch area becomes larger. As another example, if it is determined that the tap down event occurs, the processor 140 may increase an audio level of the electronic device 100. The processor 140 may set the audio level to a higher level as the touch area becomes larger.

FIG. 6 illustrates a user interface, according to various embodiments of the present disclosure.

Figure 6A:
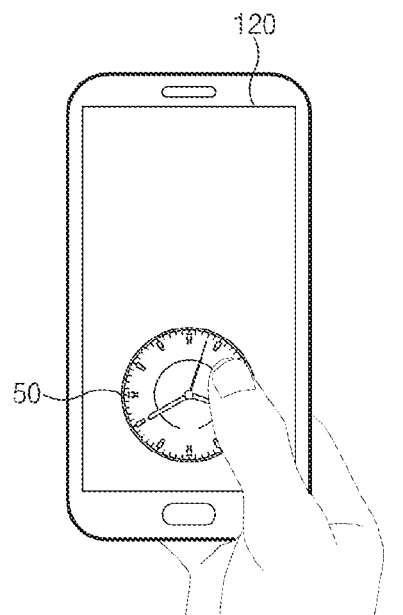
FIGS. 6A to 6E illustrate a user interface, according to various embodiments of the present disclosure.
Figure 6B:
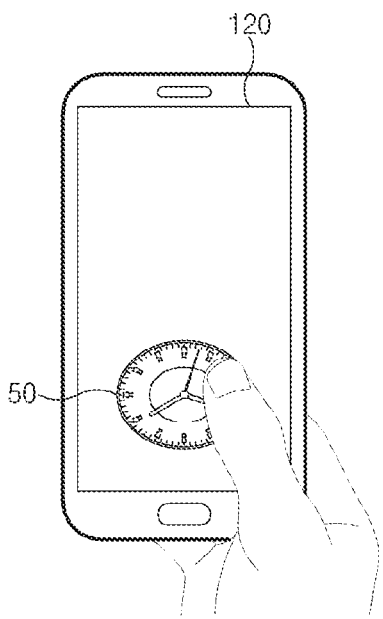
Figure 6C:
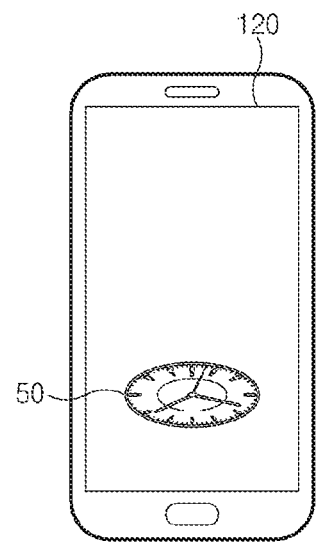
Figure 6D:
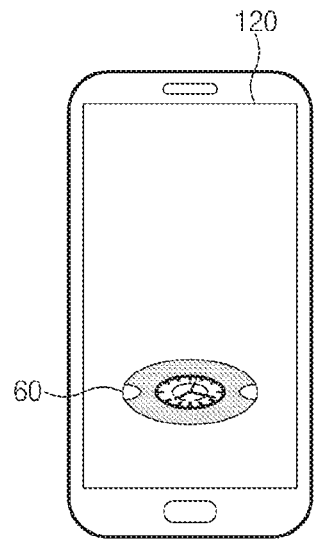
Figure 6E:
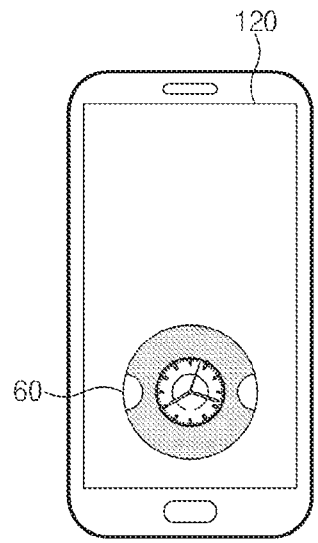

Referring to FIG. 6A, the display 120 may be capable of displaying a user interface. According to an embodiment, the user interface displayed on the display 120 may include an image object 50. A user may input, for example, a tap down event by touching a finger to the display 120.

According to an embodiment, if a difference value between a touch area corresponding to a touch manipulation and a reference value is greater than or equal to a first reference value, the display 120 may change and display the image object 50. For example, referring to FIG. 6B, the display 120 may display the image object 50 in the form in which the image object 50 is rotated in an input direction (e.g., toward a lower side of the display 120) of the tap down event. According to an embodiment, the display 120 may display the image object 50 in the form in which the image object 50 is rotated more and more as the difference value between the reference area and the touch area corresponding to the touch manipulation becomes greater. According to various embodiments of the present disclosure, the change of the user interface displayed on the display 120 based on the difference value between the reference area and the touch area corresponding to the touch manipulation may guide a tap down manipulation of the user.

According to an embodiment, if the difference value between the reference area and the touch area corresponding to the touch manipulation is greater than or equal to the second reference value, the display 120 may display the user interface corresponding to the input of the tap down event. For example, referring to FIGS. 6C to 6E, the display 120 may rotate the image object 50 in the input direction of the tap down event and may change and display the image object 50 into another image object 60 while the image object 50 rotates.

Figure 7:
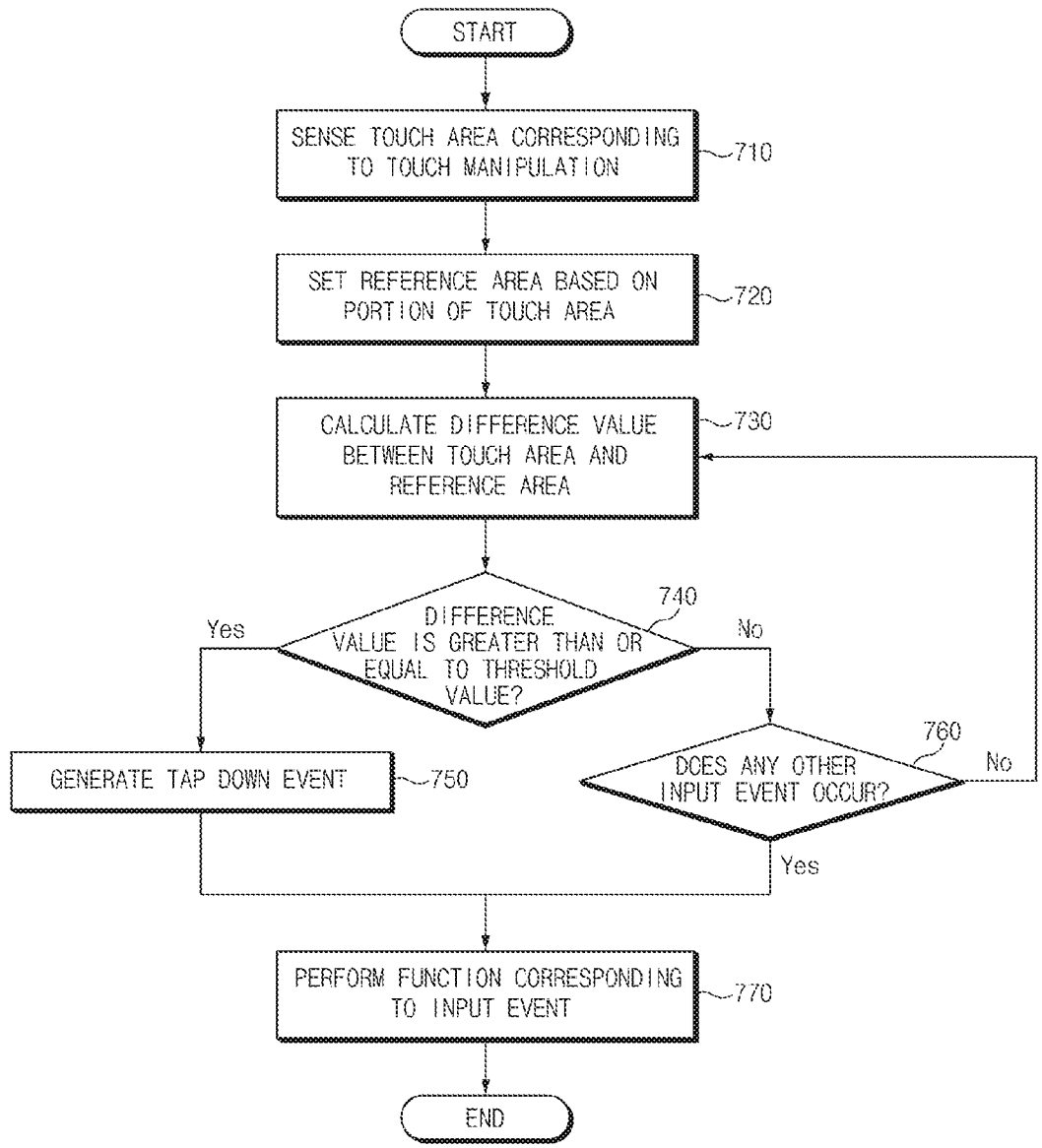
FIG. 7 is a flowchart illustrating an input processing method of an electronic device, according to various embodiments of the present disclosure.

FIG. 7 is a flowchart illustrating an input processing method of an electronic device, according to various embodiments of the present disclosure.

A flowchart illustrated in FIG. 7 may include operations that the electronic device 100 illustrated in FIG. 1 processes. Even though omitted below, a description of the electronic device 100 given with reference to FIGS. 1 to 6 may be also applied to the flowchart illustrated in FIG. 7.

Referring to FIG. 7, in operation 710, the electronic device 100 (e.g., the input panel 110) may sense a touch area corresponding to a touch manipulation of a user. According to an embodiment, the electronic device 100 may sense the touch area corresponding to the touch manipulation of the user through the input panel 110 at a specified period. According to various embodiments, the electronic device 100 may sense touch coordinates corresponding to the touch manipulation of the user together with the touch area.

According to an embodiment, in operation 720, the electronic device 100 (e.g., the processor 140) may set a reference area based on a portion of the touch area. According to an embodiment, the electronic device 100 may set a touch area, which is first sensed by the input panel 110 with regard to one touch manipulation, as the reference area. According to an embodiment, the processor 100 may set a representative value (e.g., an average value, a minimum value, a maximum value, or the like) of a plurality of touch areas (e.g., five), which are successively received from the touch area first sensed by the input panel 110, as the reference area.

According to an embodiment, in operation 730, the electronic device 100 (e.g., the processor 140) may calculate a difference value between the touch area and the reference area. For example, the electronic device 100 may sense the touch area through the input panel 110 at the specified period. According to an embodiment, the electronic device 100 may calculate the difference value (or an area variation) by comparing the reference area with the touch area whenever the touch area is sensed.

According to an embodiment, in operation 740, the electronic device 100 (e.g., the processor 140) may determine whether the difference value between the touch area and the reference area is greater than or equal to a reference value (e.g., an area reference value).

According to an embodiment, if the difference value between the touch area and the reference area is greater than or equal to the reference value, in operation 750, the electronic device 100 (e.g., the processor 140) may determine that a tap down event occurs.

According to an embodiment, if the difference value between the touch area and the reference area is less than the reference value, in operation 760, the electronic device 100 (e.g., the processor 140) may determine whether any other input event occurs.

According to an embodiment, if the other input event does not occur, in operation 730, the electronic device 100 (e.g., the processor 140) may calculate the difference value between the touch area and the reference area.

According to an embodiment, if the tap down event or the other input event occurs, in operation 770, the electronic device 100 (e.g., the processor 140) may perform a function corresponding to the input event. For example, if the tap down event occurs, the electronic device 100 may change a type, a shape, a location, and the like of a user interface (or content) displayed on the display 120. According to an embodiment, if it is determined that the tap down event occurs, the electronic device 100 may perform a function corresponding to the tap down event immediately. According to an embodiment, if the touch manipulation of the user ends (e.g., if a touch up event occurs) after it is determined that the tap down event occurs, the electronic device 100 may perform the function corresponding to the tap down event.

According to an embodiment described with reference to FIG. 7, it is described that the electronic device 100 determines whether the tap down event occurs based on the difference value between the touch area and the reference area. However, according to various embodiments of the present disclosure, the electronic device 100 may determine whether the tap down event occurs by additionally considering at least one of a rate of change of the touch area, a moving direction of the touch coordinates, and the amount of movement of the touch coordinates in addition to the difference value between the touch area and the reference area. For example, if the difference value between the touch area and the reference area is greater than or equal to a specified value (e.g., the area reference value) and the rate of change of the touch area is greater than or equal to a specified value (e.g., a reference value for a rate of change), the electronic device 100 may determine that the tap down event occurs. For example, the rate of change of the touch area may be calculated based on the touch area sensed through the input panel 110. As another example, if the difference value between the touch area and the reference area is greater than or equal to the specified value (e.g., the area reference value) and the touch coordinates move in a specified direction (e.g., y-axis) by a specified distance or more (e.g., a distance reference value), the electronic device 100 may determine that the tap down event occurs. For example, the moving direction and the amount of movement of the touch coordinates may be calculated based on the touch coordinates sensed through the input panel 110. The specified direction may be, for example, a direction that faces a lower side of a user interface displayed on the display 120. As another example, if the difference value between the touch area and the reference area is greater than or equal to the specified value (e.g., the area reference value), the rate of change of the touch area is greater than or equal to the specified value (e.g., the reference value for a rate of change), and the touch coordinates move in the specified direction (e.g., y-axis) by the specified distance or more (e.g., the distance reference value), the electronic device 100 may determine that the tap down event occurs.

Figure 8:
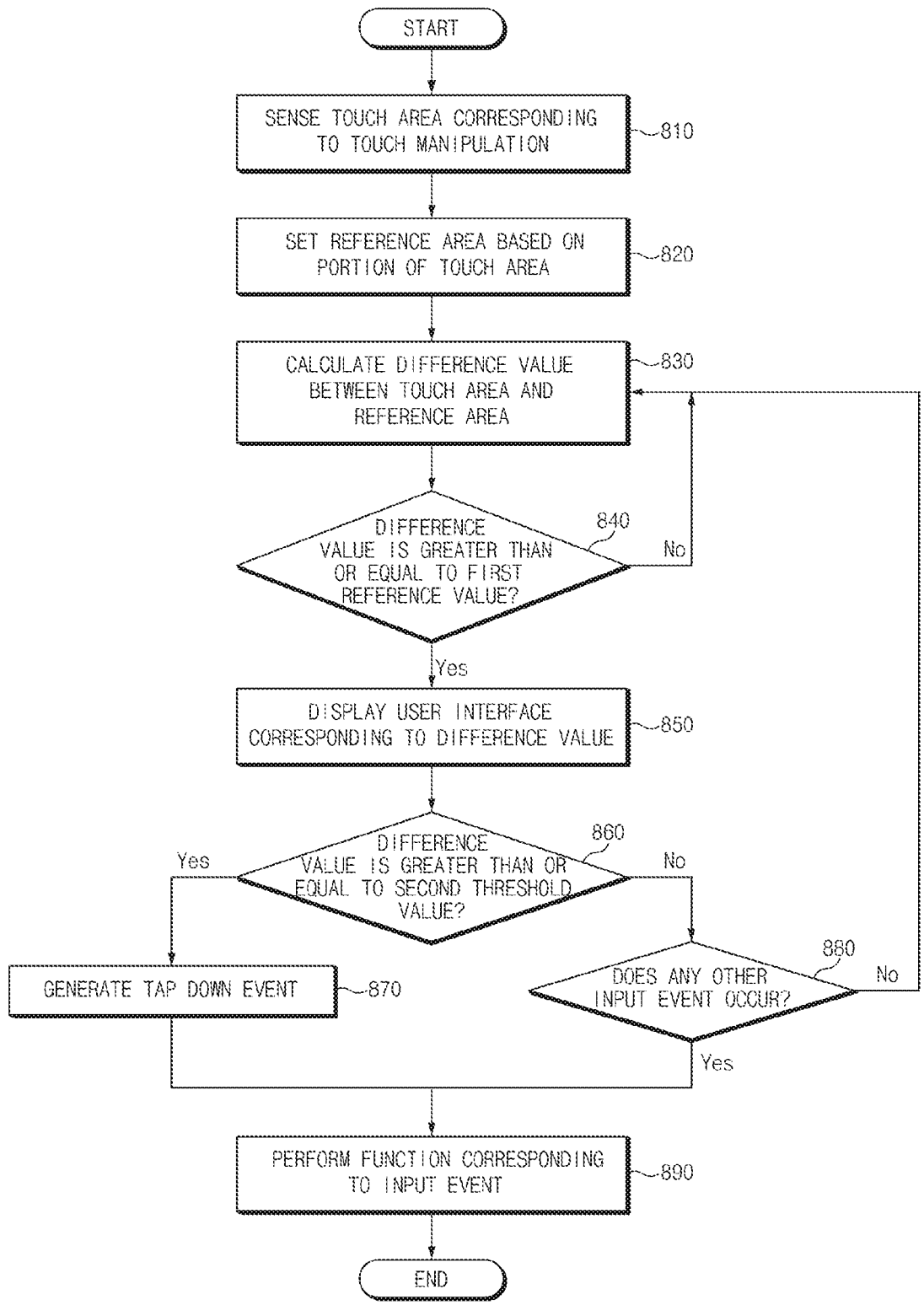
FIG. 8 is a flowchart illustrating an input processing method of an electronic device, according to various embodiments of the present disclosure.

FIG. 8 is a flowchart illustrating an input processing method of an electronic device, according to various embodiments of the present disclosure.

A flowchart illustrated in FIG. 8 may include operations that the electronic device 100 illustrated in FIG. 1 processes. Even though omitted below, a description of the electronic device 100 given with reference to FIGS. 1 to 6 may be also applied to the flowchart illustrated in FIG. 8.

Referring to FIG. 8, in operation 810, the electronic device 100 (e.g., the input panel 110) may sense a touch area corresponding to a touch manipulation of a user. According to an embodiment, the electronic device 100 may sense the touch area corresponding to the touch manipulation of the user through the input panel 110 at a specified period. According to various embodiments, the electronic device 100 may sense touch coordinates corresponding to the touch manipulation of the user together with the touch area.

According to an embodiment, in operation 820, the electronic device 100 (e.g., the processor 140) may set a reference area based on a portion of the touch area. According to an embodiment, the electronic device 100 may set a touch area, which is first sensed by the input panel 110 with regard to one touch manipulation, as the reference area. According to an embodiment, the processor 100 may set a representative value (e.g., an average value, a minimum value, or a maximum value) of a plurality of touch areas (e.g., five), which are successively received from the touch area first sensed by the input panel 110, as the reference area.

According to an embodiment, in operation 830, the electronic device 100 (e.g., the processor 140) may calculate a difference value between the touch area and the reference area. For example, the processor 100 may sense the touch area through the input panel 110 at the specified period. According to an embodiment, the processor 100 may calculate the difference value (or an area variation) by comparing the reference area with the touch area whenever the touch area is sensed.

According to an embodiment, in operation 840, the electronic device 100 (e.g., the processor 140) may determine whether the difference value between the touch area and the reference area is greater than or equal to a first reference value.

According to an embodiment, if the difference value between the touch area and the reference area is less than the first reference value, in operation 830, the electronic device 100 (e.g., the processor 140) may calculate the difference value between the touch area and the reference area.

According to an embodiment, if the difference value between the touch area and the reference area is greater than or equal to the first reference value, in operation 850, the electronic device 100 (e.g., the processor 140) may display a user interface corresponding to the difference value between the touch area and the reference area on the display 120.

According to an embodiment, in operation 860, the electronic device 100 (e.g., the processor 140) may determine whether the difference value between the touch area and the reference area is greater than or equal to a second reference value.

According to an embodiment, if the difference value between the touch area and the reference area is greater than or equal to the second reference value (e.g., an area reference value), in operation 870, the electronic device 100 (e.g., the processor 140) may determine that a tap down event occurs.

According to an embodiment, if the difference value between the touch area and the reference area is less than the second reference value, in operation 880, the electronic device 100 (e.g., the processor 140) may determine whether any other input event occurs.

According to an embodiment, if the tap down event or the other input event occurs, in operation 890, the electronic device 100 (e.g., the processor 140) may perform a function corresponding to the input event. For example, if the tap down event occurs, the electronic device 100 may change a type, a shape, a location, and the like of the user interface (or content) displayed on the display 120. According to an embodiment, if it is determined that the tap down event occurs, the electronic device 100 may perform a function corresponding to the tap down event immediately. According to an embodiment, if the touch manipulation of the user ends (e.g., if a touch up event occurs) after it is determined that the tap down event occurs, the electronic device 100 may perform the function corresponding to the tap down event.

At least a part of an apparatus (e.g., modules or functions thereof) or a method (e.g., operations) according to various embodiments may be, for example, implemented by instructions stored in a computer-readable storage media in the form of a program module. The instruction, when executed by one or more processors (e.g., the processor 140 of FIG.

1), may cause the one or more processors to perform a function corresponding to the instruction. The computer-readable storage media, for example, may be a memory (e.g., the memory 130 of FIG. 1).

A computer-readable recording medium may include a hard disk, a floppy disk, a magnetic media (e.g., a magnetic tape), an optical media (e.g., a compact disc read only memory (CD-ROM), a digital versatile disc (DVD), or a magneto-optical media (e.g., a floptical disk)), and a hardware device (e.g., a read only memory (ROM), a random access memory (RAM), or a flash memory). Also, a program instruction may include not only a mechanical code such as things generated by a compiler but also a high-level language code executable on a computer using an interpreter. The above-mentioned hardware device may be configured to operate as one or more software modules to perform operations according to various embodiments of the present disclosure, and vice versa.

Modules or program modules according to various embodiments of the present disclosure may include at least one or more of the above-mentioned components, some of the above-mentioned components may be omitted, or other additional components may be further included therein. Operations executed by modules, program modules, or other elements may be executed by a successive method, a parallel method, a repeated method, or a heuristic method. Also, some of operations may be executed in different sequences, omitted, or other operations may be added. While the present disclosure has been shown and described with reference to various embodiments thereof, it will be understood by those skilled in the art that various changes in form and details may be made therein without departing from the spirit and scope of the present disclosure as defined by the appended claims and their equivalents.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An electronic device comprising:
    an input panel; and
    a processor, the processor configured to:
        detect a touch input of a user through the input panel,
        obtain a touch area corresponding to the touch input of the user,
        wherein the input panel is configured to obtain touch coordinates corresponding to the touch input of the user periodically,
        calculate a rate of change of the touch area based on the touch area,
        determine a moving direction and an amount of movement of the touch coordinates using the touch coordinates, and
        determine that a touch event occurs if an amount of an area variation is greater than or equal to an area reference value, and the rate of change of the touch area is greater than or equal to a reference value for the rate of change and the touch coordinates move in a specified direction by a distance reference value.

2. The electronic device of claim 1, wherein the processor is further configured to set a touch area which is first obtained in response to the touch input as the area reference value.

3. The electronic device of claim 1, wherein the processor is further configured to obtain a plurality of touch areas continuously after a touch area which is first obtained in response to the touch input, and set a representative value of the plurality of touch areas as the area reference value.

4. The electronic device of claim 1, further comprising:
    a display configured to display a user interface, wherein the specified direction is a direction that faces a lower side of the user interface.

5. The electronic device of claim 1, further comprising:
    a display configured to display a user interface,
    wherein the processor is further configured to:
        in response to a difference value between the touch area and the area reference value being at least a first reference value, change the user interface displayed on the display so as to correspond to the difference value, and
        in response to the difference value between the increased touch area and the area reference value being at least a second reference value that is greater than the first reference value, determine that the touch event occurs.

6. The electronic device of claim 1, wherein in response to determining that the touch event occurs, the processor is further configured to perform a function corresponding to the touch event immediately.

7. The electronic device of claim 1, wherein in response to the touch input ending after determining the touch event occurs, the processor is further configured to perform a function corresponding to the touch event.

8. An input processing method of an electronic device, the method comprising:
    detecting a touch input of a user through an input panel,
    obtaining a touch area corresponding to the touch input of the user, and
    calculating a rate of change of the touch area based on the touch area;
    obtaining touch coordinates corresponding to the touch input of the user periodically;
    determining a moving direction and an amount of movement of the touch coordinates using the touch coordinates; and
    determining that a touch event occurs if an amount of an area variation is greater than or equal to an area reference value, and the rate of change of the touch area is greater than or equal to a reference value for the rate of change, and the touch coordinates move in a specified direction by a distance reference value.

9. The method of claim 8, further comprising:
    setting a touch area which is first obtained in response to the touch input as the area reference value.

10. The method of claim 8, further comprising:
    obtaining a plurality of touch areas continuously after a touch area which is first obtained in response to the touch input, and
    setting a representative value of the plurality of touch areas as the area reference value.

11. The method of claim 8, wherein the specified direction is a direction that faces a lower side of a user interface displayed on a display.

12. The method of claim 8, further comprising:
    in response to a difference value between the increased touch area and the area reference value being at least a first reference value, changing a user interface displayed on a display so as to correspond to the difference value, and
    in response to the difference value between the increased touch area and the area reference value being at least a second reference value that is greater than the first reference value, determining that the touch event occurs.

13. The method of claim 8, further comprising:
in response to determining that the touch event occurs, performing a function corresponding to the touch event immediately.

14. The method of claim 8, further comprising:
in response to the touch input ending after determining the touch event occurs, performing a function corresponding to the touch event.

15. A non-transitory computer-readable recording medium in which a program is recorded, the program comprising instructions that, when executed by at least one processor, cause an electronic device to:
detect a touch input of a user through an input panel,
obtain a touch area corresponding to the touch input of the user, and
wherein the electronic device is configured to obtain touch coordinates corresponding to the touch input of the user periodically, and
wherein, the program comprising the instructions that cause further the electronic device to:
calculate a rate of change of the touch area based on the touch area, determine a moving direction and an amount of movement of the touch coordinates using the touch coordinates, and
determine that a touch event occurs if an amount of an area variation is greater than or equal to an area reference value, and the rate of change of the touch area is greater than or equal to a reference value for the rate of change, and the touch coordinates move in a specified direction by a distance reference value.

16. The non-transitory computer-readable recording medium of claim 15, wherein the program further comprises instructions that, when executed by at least one processor, cause the electronic device to:
in response to a difference value between the increased touch area and the area reference value being at least a first reference value, change a user interface displayed on a display so as to correspond to the difference value, and
in response to the difference value between the increased touch area and the area reference value being at least a second reference value that is greater than the first reference value, determine that the touch event occurs.

* * * * *